(12) United States Patent
Ichikawa et al.

(10) Patent No.: US 9,505,358 B2
(45) Date of Patent: Nov. 29, 2016

(54) WIRE HARNESS

(75) Inventors: Hidehiro Ichikawa, Kosai (JP);
Masahiro Takamatsu, Kosai (JP);
Shigemi Hashizawa, Kosai (JP)

(73) Assignee: YAZAKI CORPORATION, Tokyo (JP)

( * ) Notice: Subject to any disclaimer, the term of this patent is extended or adjusted under 35 U.S.C. 154(b) by 258 days.

(21) Appl. No.: 14/233,451

(22) PCT Filed: Jul. 20, 2012

(86) PCT No.: PCT/JP2012/068499
§ 371 (c)(1),
(2), (4) Date: Jan. 17, 2014

(87) PCT Pub. No.: WO2013/012075
PCT Pub. Date: Jan. 24, 2013

(65) Prior Publication Data
US 2014/0174784 A1    Jun. 26, 2014

(30) Foreign Application Priority Data

Jul. 21, 2011   (JP) .................................. 2011-160134

(51) Int. Cl.
*H01B 7/04* (2006.01)
*H01B 7/00* (2006.01)
*H02G 3/04* (2006.01)
(Continued)

(52) U.S. Cl.
CPC ....... *B60R 16/0207* (2013.01); *B60R 16/0215* (2013.01); *H01B 7/0045* (2013.01); *H01B 7/04* (2013.01); *H02G 3/04* (2013.01);
(Continued)

(58) Field of Classification Search
CPC  B60R 16/0207; B60R 16/0215; H02G 3/04; H02G 3/0468; H02G 3/0406; H02G 13/00; G02B 6/4459
USPC ............ 174/102 D, 102 R, 70 R, 68.3, 68.1; 138/118, 121, 122, 133
See application file for complete search history.

(56) References Cited

U.S. PATENT DOCUMENTS 5,661,453 A * 8/1997 Justus ................. B60R 16/0215
340/438
5,971,033 A * 10/1999 Lanz ........................ F16L 9/06
138/121
(Continued)

FOREIGN PATENT DOCUMENTS

CN    1816953 A      8/2006
JP    10-248137 A    9/1998
(Continued)

OTHER PUBLICATIONS

Machine translation of Japanese Patent: JP-A-2010-49947, Published Mar. 4, 2010, Yazaki Corporation.
(Continued)

*Primary Examiner* — Dimary Lopez Cruz
(74) *Attorney, Agent, or Firm* — Sughrue Mion, PLLC (57) ABSTRACT

A wire harness for which an exterior member can be maintained in a desired shape is provided. A flexible, tubular corrugated tube (16) which covers electric wires (18) and a route keeping tape (17) which is more difficult to extend or buckle in the widthwise direction than the corrugated tube (16) are included, and the route keeping tape (17) is wound helically around a bent part (20), which is formed by bending the corrugated tube (16), along the longitudinal direction.

5 Claims, 6 Drawing Sheets (51) Int. Cl.
  *B60R 16/02* (2006.01)
  *F16L 11/24* (2006.01)
(52) U.S. Cl.
  CPC ......... *H02G 3/0406* (2013.01); *H02G 3/0468* (2013.01); *F16L 11/24* (2013.01)

(56) References Cited

U.S. PATENT DOCUMENTS

| | | | |
|---|---|---|---|
| 6,960,722 | B2 | 11/2005 | Frederick et al. |
| 8,653,372 | B2 * | 2/2014 | Muneyasu .......... B60R 16/0207 174/110 R |
| 8,858,428 | B2 * | 10/2014 | Miyoshi ............... A61B 1/0052 600/136 |
| 2004/0206540 | A1 | 10/2004 | Frederick et al. |
| 2005/0011687 | A1 | 1/2005 | Yamaguchi et al. |
| 2006/0201567 | A1 | 9/2006 | Goddard et al. |
| 2006/0283515 | A1 | 12/2006 | Kanao |
| 2007/0102182 | A1 | 5/2007 | Okada et al. |

FOREIGN PATENT DOCUMENTS

| | | | |
|---|---|---|---|
| JP | 2004-224156 | A | 8/2004 |
| JP | 2007-024228 | A | 2/2007 |
| JP | 2010-049947 | A | 3/2010 |

OTHER PUBLICATIONS

Machine translation of Japanese Patent: JP-A-2007-24228, Published Feb. 1, 2007, Kanaflex Corporation.

Machine translation of Japanese Patent: JP-A-10-248137, Published Sep. 14, 1998, Sumitomo Wiring Systems, LTD.

Office Action dated Jul. 7, 2015, issued by the Japanese Patent Office in counterpart Japanese Patent Application No. 2011-160134.

Translation of Written Opinion (PCT/ISA/237) issued Sep. 25, 2012, in corresponding International Application No. PCT/JP2012/068499.

International Search Report (PCT/ISA/210); issued Sep. 25, 2012, in corresponding International Application No. PCT/JP2012/068499.

Written Opinion (PCT/ISA/237); issued Sep. 25, 2012, in corresponding International Application No. PCT/JP2012/068499.

Office Action and Search Report issued on Nov. 4, 2015 by the State Intellectual Property Office of P.R. China in counterpart Chinese Application No. 201280036162.X.

Extended European Search Report issued on Nov. 11, 2015 by the European Patent Office in counterpart European Application No. 12814390.6.

* cited by examiner

WIRE HARNESS

TECHNICAL FIELD

The present invention relates to a wire harness.

BACKGROUND ART

A wire harness disclosed in the following patent document 1 includes three high voltage electric wires, and three metal protecting pipes for accommodating and protecting the three high voltage electric wires respectively.

The high voltage electric wires connect a motor which is carried in the front of a vehicle and an inverter which is carried in the middle of the vehicle or at the rear side of the vehicle. The high voltage electric wires are wired from a battery in the middle of the vehicle or at the rear side of the vehicle to the motor in the front of the vehicle through the bottom of a vehicle body floor which is the outer side of a vehicle frame.

A stone splash or a water splash may occur to the high voltage electric wires which are wired through the bottom of the vehicle body floor in this way. The high voltage electric wires are covered by metal protecting pipes to be protected from a stone splash or a water splash. The metal protecting pipe has a function of preventing the high voltage electric wire from a stone splash or a water splash and a function to protect the high voltage electric wire from being bended due to the stiffness of the metal protecting pipe. The metal protecting pipe has an electromagnetic shielding function because the metal protecting pipe is made of metal.

A wire harness is manufactured by inserting the three high voltage electric wires into the metal protecting pipes which are straight, respectively, and bending the metal protecting pipes along the wiring route of the wire harness under the vehicle body floor. After the wire harness is manufactured as above in the factory of a harness manufacturer, the wire harness is conveyed to an assembly factory of a vehicle manufacturer. Then the wire harness is assembled to a predetermined position of a vehicle. Thereby, the wiring of the wire harness is completed.

CITATION LIST

Patent Documents

Patent document 1: JP-A-2004-224156

SUMMARY OF INVENTION

Technical Problem

In the traditional techniques described above, when the wire harness is conveyed, to prevent the metal protecting pipes from contacting each other and being damaged or being deformed, it is necessary to secure an enough space for each of the metal protecting pipes and for each of the wire harnesses. Because the metal protecting pipe is manufactured by being bended three-dimensionally, it is necessary to secure a three-dimensional space.

In order to solve the above problems, it is considered to replace the metal protecting pipes with flexible pipe bodies. However, the following problems occur when only the flexible pipe bodies are used.

First, when the flexible pipe bodies are used, it is difficult to maintain a desired shape at the time of assembling and wiring the wire harness and after the wiring.

When the flexible pipe bodies are used, to assemble the pipe bodies to a predetermined position of a vehicle, for example, a protector is necessary. Because the protector is a resin molded member which matches with the wiring route, the protector becomes an exclusive member/exclusive design for each vehicle. Thereby, the versatility is decreased and the cost is increased.

Since the metal mold may have to be tried for many times at the development stage when the protector is used, design expense, metal mold expense, design time or the like are spent.

Because the part where the protector is assembled to a pipe body is upsized when the protector is used, the protector provided under the vehicle floor approaches the ground and troubles may occur.

The present invention is made in view of the above problems, and the object of the present invention is to provide a wire harness for which an exterior member can be maintained in a desired shape.

Solution to Problem

To achieve the previously described object, the wire harnesses of the present invention are characterized in the following (1) to (4).

(1) A wire harness comprising:
an exterior member, having a flexibility and tubular shape, and covering at least one conductive path; and
a route keeping tape which is more difficult to extend and buckle in a widthwise direction than the exterior member,
wherein the route keeping tape is wound helically around a bent part, which is formed by bending the exterior member, along a longitudinal direction.

For the construction of the above (1), the route keeping tape is wound around so that the shape of the bent part is maintained in a bended shape. Therefore, the exterior member is maintained in a desired shape by using the route keeping tape instead of a protector.

(2) The wire harness according to the above (1), wherein the exterior member is formed with convex parts and concave parts, which extend in a peripheral direction, alternately along the longitudinal direction, and
top surfaces of the convex parts are formed to a peripheral surface which extends in parallel to a central axis of the exterior member in a cross section in parallel to the central axis, and a width of the top surfaces of the convex parts in the central axis direction is longer than a width of bottom surfaces which define the concave parts in the central axis direction.

For the construction of the above (2), the area where the exterior member and the route keeping tape contact is large. Therefore, the route keeping tape can be strongly fixed to the exterior member when the route keeping tape and the exterior member are attached together. Thereby, the shape of the bent part is maintained surely.

(3) The wire harness according to the above (2), wherein a width of the route keeping tape in the central axis direction is longer than the width of the bottom surfaces which define the concave parts in the central axis direction, so that the route keeping tape is wound around the bent part to cover the concave parts.

For the construction of the above (3), the interval between the adjacent convex parts which sandwich the concave part which is covered by the route keeping tape can be maintained surely.

(4) The wire harness according to the above (1), wherein the exterior member is formed with convex parts and concave parts, which extend in a peripheral direction, alternately along a longitudinal direction, top surfaces of the convex parts are formed into a plane shape, a rising angle of the convex parts is sharp, and a width of the top surfaces of the convex parts in a central axis direction of the exterior member is long.

For the construction of the above (4), when the bended shape of the bent part is maintained, the interval between the convex parts which are adjacent to each other is fixed surely. Furthermore, the top surfaces of the adjacent convex parts are connected surely by the route keeping tape.

DESCRIPTION OF EMBODIMENTS

The wire harness according to one embodiment of the present invention is described with reference to the figures as follows.

Figure 1:
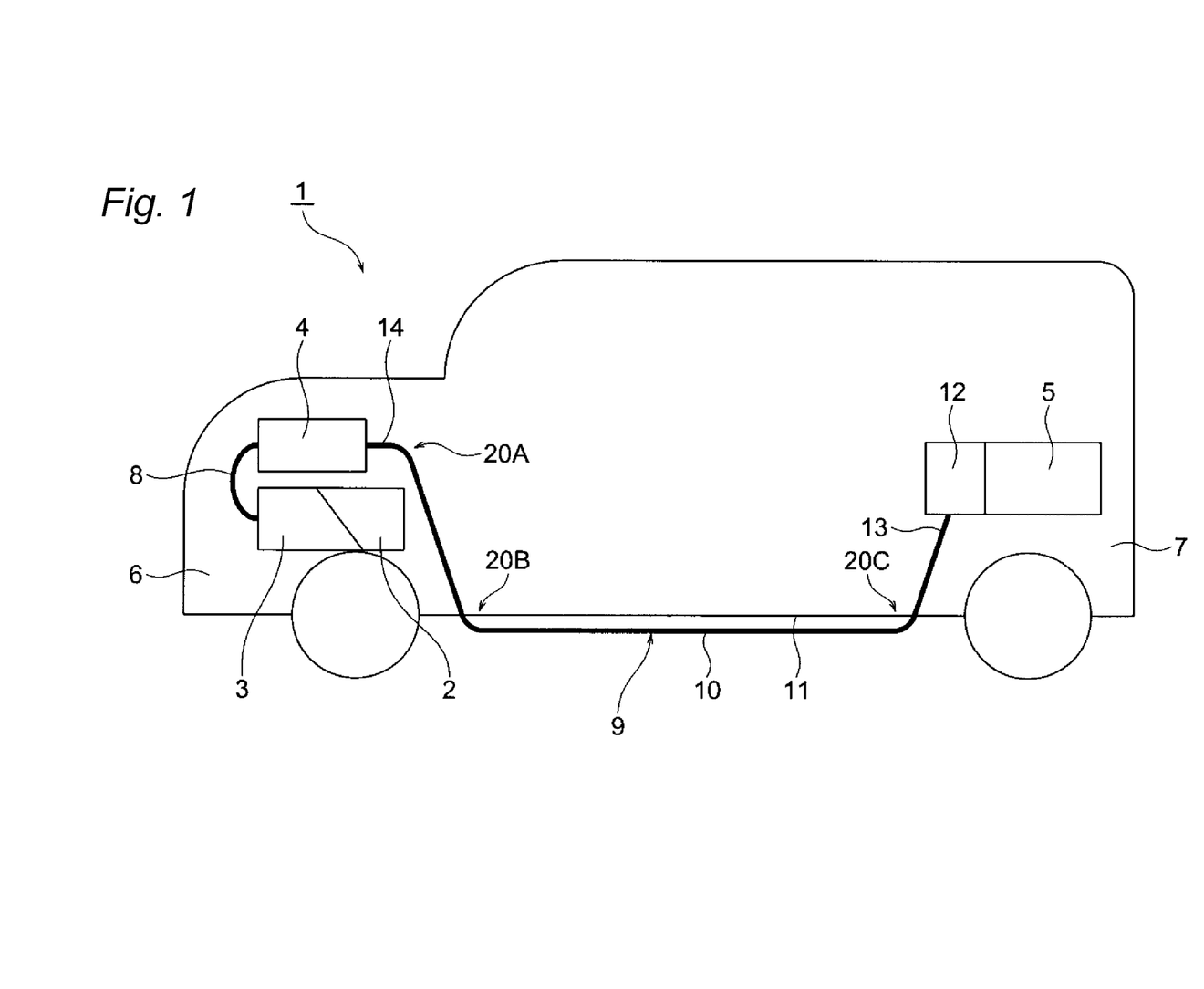
FIG. 1 is a schematic view which shows an example when the wire harness according to one embodiment of the present invention is wired in a hybrid vehicle.
Figure 2:
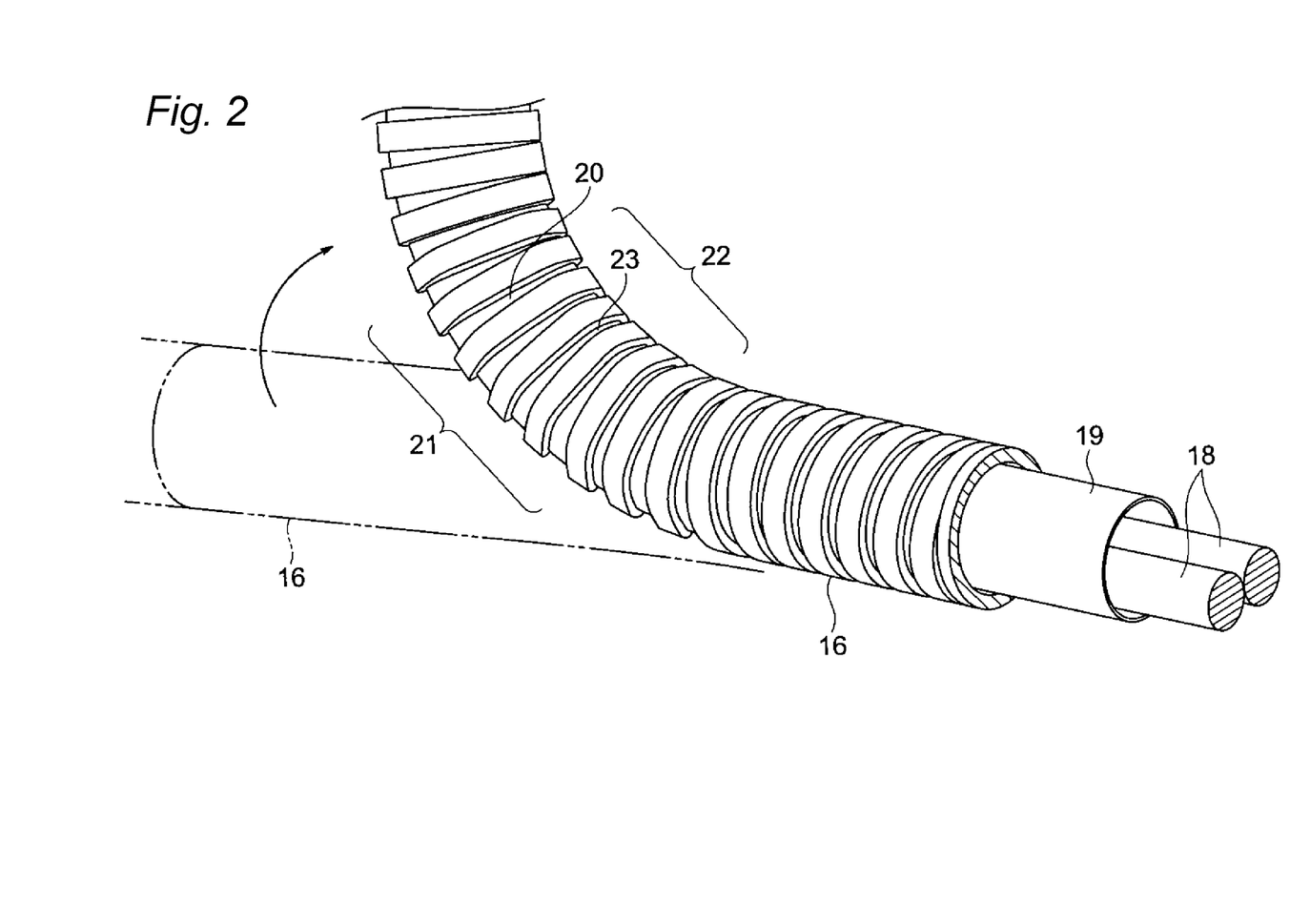
FIG. 2 is an appearance perspective view which shows a state after the wire harness is bended from a straight state.
Figure 3:
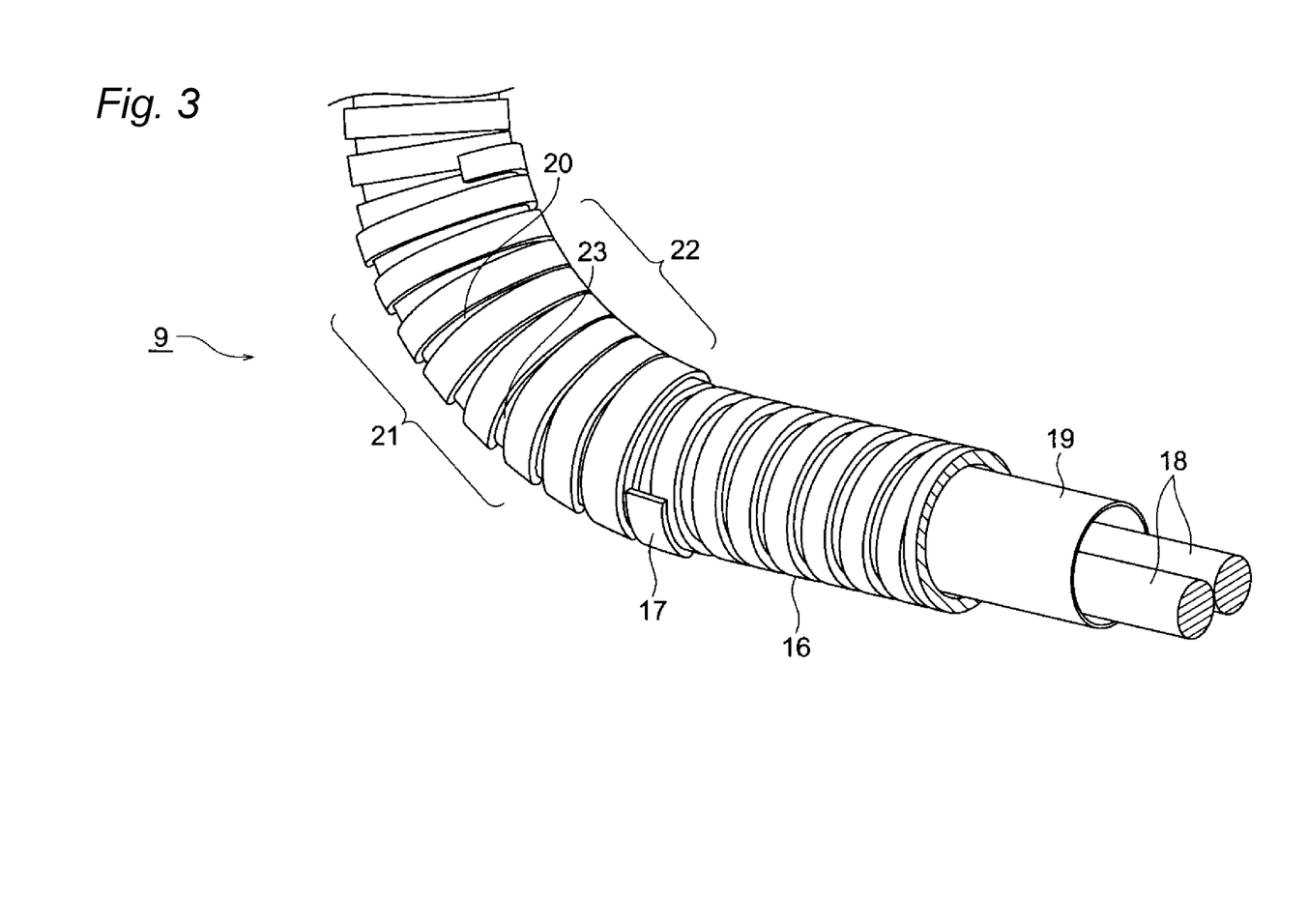
FIG. 3 is an appearance perspective view which shows that a route keeping tape is wound around a bent part of the wire harness.
Figure 4A:
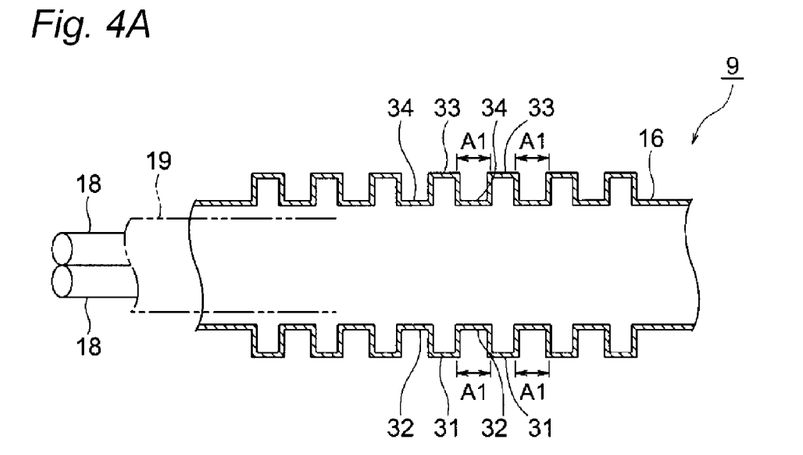
FIG. 4A is a longitudinal sectional view of the wire harness before a corrugated tube is bended.
Figure 4B:
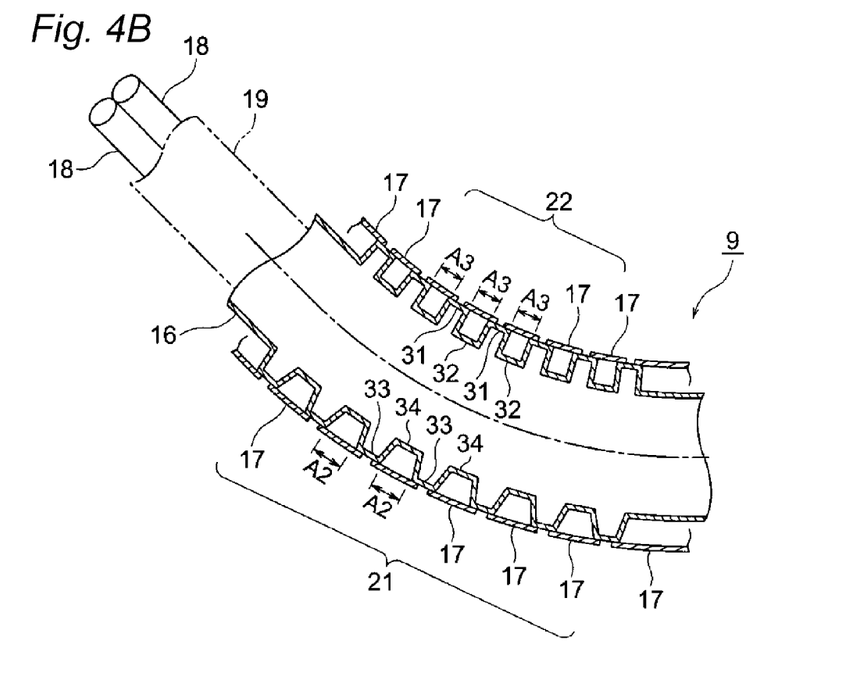
FIG. 4B is a longitudinal sectional view of the wire harness after the corrugated tube is bended.
Figure 5:
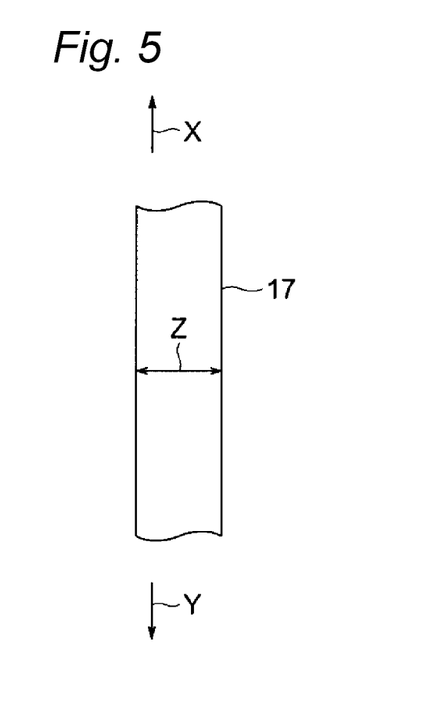
FIG. 5 is an illustrative view to describe the extensibility of the route keeping tape.
Figure 6A:
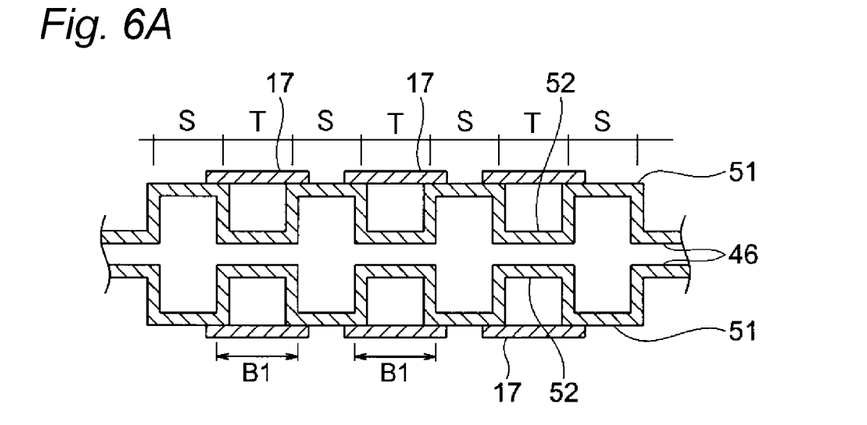
FIG. 6A is a figure which shows an example of the cross-section of the convex parts and the concave parts of the corrugated tube.
Figure 6B:
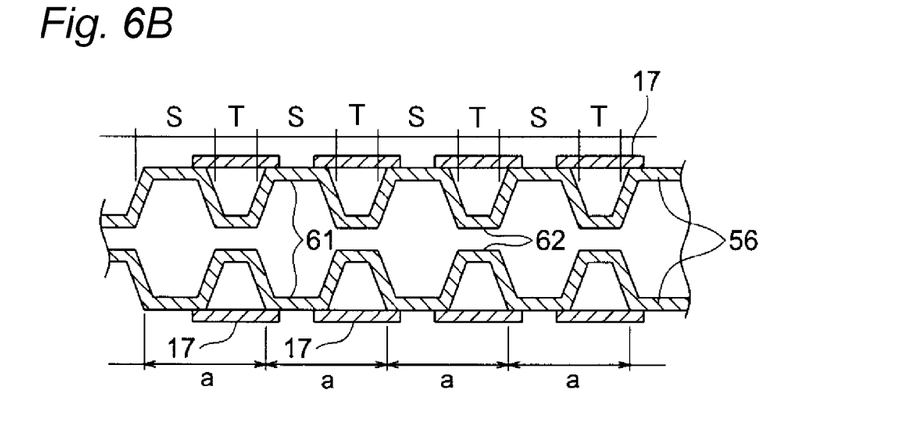
FIG. 6B is a figure which shows another example.
Figure 6C:
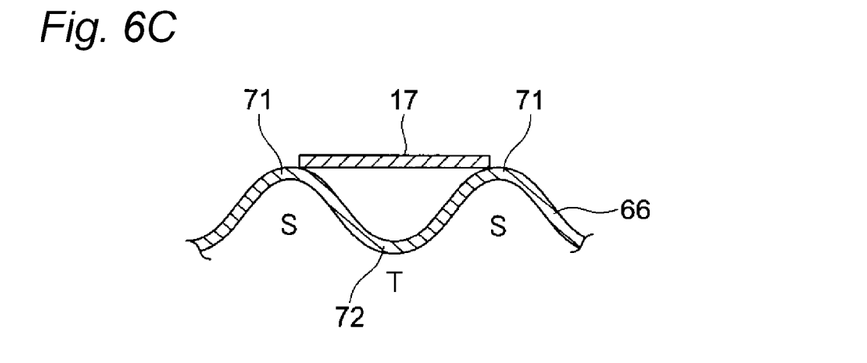
FIG. 6C is a figure which shows an example of the cross-section of the convex parts and the concave parts of a traditional corrugated tube.

FIG. 1 is a schematic view which shows an example when the wire harness according to one embodiment of the present invention is wired in a hybrid vehicle. FIG. 2 is an appearance perspective view which shows a state after the wire harness is bended from a straight state. FIG. 3 is an appearance perspective view which shows that a route keeping tape is wound around a bent part of the wire harness. FIG. 4A is a longitudinal sectional view of the wire harness before a corrugated tube is bended, and FIG. 4B is a longitudinal sectional view of the wire harness after the corrugated tube is bended. FIG. 5 is an illustrative view to describe the extensibility of the route keeping tape. FIG. 6 A is a figure which shows an example of the cross-section of the convex parts and the concave parts of the corrugated tube, FIG. 6B is a figure which shows another example, and FIG. 6C is a figure which shows an example of the cross-section of the convex parts and the concave parts of a traditional corrugated tube.

In this embodiment, an example in which the wire harness is applied to a hybrid vehicle (or an electric vehicle) is given and described.

In FIG. 1, a hybrid vehicle 1 is a vehicle which is driven by mixing two powers of an engine 2 and a motor unit 3. The electric power from a battery 5 (battery pack) is supplied to the motor unit 3 via an inverter unit 4. The engine 2, the motor unit 3 and the inverter unit 4 are carried in an engine room 6 at the position of the front wheels and the like. The battery 5 is carried in a vehicle rear part 7 of rear wheels and the like (the battery 5 may be carried in an indoor space behind the engine room 6).

The motor unit 3 and the inverter unit 4 are connected by a well-known high voltage wire harness 8. The battery 5 and the inverter unit 4 are connected by a high voltage wire harness 9 according to the present embodiment.

The wire harness 9 and the battery 5 are connected through a junction block 12 which the battery 5 is provided with. A rear end 13 of the wire harness 9 is connected to the junction block 12 with a connector. The side of the wire harness 9 at the rear end 13 is wired above the floor at the indoor side of the vehicle. The side of the wire harness 9 at a front end 14 is also wired above the floor. The side of the wire harness 9 at a front end 14 is connected to the inverter unit 4 with a connector. A middle part 10, which is located between the front end 14 and the rear end 13, of the wire harness 9 is wired below a vehicle body floor 11.

The motor unit 3 includes a motor (not shown in the figure) and a generator (not shown in the figure) in construction. The inverter unit 4 includes an inverter (not shown in the figure) and a converter (not shown in the figure) in construction. The motor unit 3 is formed as a motor assembly including a shielding case (not shown in the figure). The inverter unit 4 is also formed as an inverter assembly including a shielding case. The battery 5 is a Ni-MH battery or Li-ion battery, and is modularized. An electricity accumulating device such as a capacitor may be used. The battery 5 is not particularly limited to the construction according to the present embodiment as long as the battery 5 may be used for the hybrid vehicle 1 or an electric vehicle.

A structure of the wire harness 9 is described below in detail with reference to FIGS. 2 to 5.

The wire harness 9 includes two electric wires 18, an electromagnetic shielding member 19 which collectively covers the two electric wires 18, and a corrugated tube 16 which is provided at the outer side of the electromagnetic shielding member 19 to cover the electromagnetic shielding member 19 and functions as an exterior member.

The electric wire 18 is a conductive path which includes a conductor and an insulator, and is formed to have a length that is necessary for electrical connection. Connectors are provided respectively at the two ends of the electric wire 18, one end is connected to the connector of the junction block 12 (refer to FIG. 1) and the other end is connected to the connector of the inverter unit 4 (refer to FIG. 1), respectively. The conductor is manufactured of copper, copper alloy, aluminum or aluminum alloy. The conductor may be either a conductor structure in which strands are twisted or a rod-like conductor structure whose cross section is a rectangular shape or a round shape (for example, a conductor structure with a rectangular single core or a round single core, and in this case, the electric wire itself becomes rod-like). In this embodiment, two electric wires 18 are used as the conductive paths, but the number of the electric wires 18 is not limited, and the conductive path is also not limited to electric wires. For example, it is also possible to provide an insulator to a well-known bus bar to be used as a high voltage conductive path, or to use a high voltage coaxial combined conductive path which is constructed by coaxially combining n systems of circuits.

The electromagnetic shielding member 19 is intended to prevent electrical signals transmitted through the electric wires 18 from being affected by the electromagnetic wave from the outside, and the electromagnetic shielding member 19 is formed of a shielding member containing a conductive metal foil or a metal foil alone into a pipe-like shape. The electromagnetic shielding member 19 is formed to have about the same length as the full length of the two electric wires 18.

The electromagnetic shielding member 19 contains a metal foil in this embodiment, but the present invention is not limited to this. That is, as long as the electromagnetic wave can be dealt with, for example, a web which has a number of extra-fine strands may be used as the electromagnetic shielding member 19. In this case, the web has conductivity and is formed into a pipe-like shape.

The corrugated tube 16 is a bendable tubular exterior member (tube body) which has flexibility, and is a resin/metal tube (bellow tube) which has convex parts and concave parts (ridges and valleys) which are formed continuously on the outer peripheral surface along the longitudinal direction of the electric wire 18. That is, as shown in FIG. 4A, the corrugated tube 16 is formed with the convex parts and the concave parts, which extend in the peripheral direction, alternately along the longitudinal direction. The top surfaces of the convex parts are formed on a peripheral surface which extends in parallel to the central axis of the corrugated tube 16 in a cross section in parallel to the central axis. The corrugated tube 16 of the present embodiment is a resin article which has a circular cross section, but the present invention is not limited to the circular cross section, an oval cross section, quadrangular cross section or the like is also possible.

With reference to FIG. 2 again, when the corrugated tube 16 is bended in the direction shown by the arrow in FIG. 2 from a straight state (the corrugated tube 16 of imaginary lines shown by two-dots dashed lines in FIG. 2) that the electromagnetic shielding member 19 which covers the electric wires 18 is inserted into the corrugated tube 16, a bent part 20 is formed. The bent part 20, as shown in FIG. 1, is formed at the position of a bent part 20A to change the direction of the wire harness 9 in the vehicle indoor room to the inverter unit 4, a bent part 20B to change the direction of the wire harness 9 from below the vehicle body floor 11 to the vehicle indoor room, or a bent part 20C to change the direction of the wire harness 9 from the vehicle indoor room to below the vehicle body floor 11.

The bent part 20 is a bent part of the wire harness 9, and is also a bent part of the corrugated tube 16 at the same time. A number 21 at the bent part 20 shows an outer side part which has a larger R (curvature). A number 22 shows an inner side part which has a smaller R. Furthermore, a number 23 shows a side part which is a part that connects the outer side part 21 and the inner side part 22.

Then, after the bent part 20 is formed, a route keeping tape 17 is wound helically around the bent part 20 in a longitudinal direction of the corrugated tube 16 to maintain the bended shape of the bent part 20.

The principle of maintaining the bended shape of the bent part 20 by winding the route keeping tape 17 around the bent part 20 is described below with reference to FIGS. 4A to 5.

The route keeping tape 17 is used to maintain the bended shape of the corrugated tube 16 by being wound around the corrugated tube 16. Therefore, the route keeping tape 17 is processed (for example, oriented) so that the route keeping tape 17 cannot extend or buckle (fold) to a degree of almost having no deformation in the widthwise direction (a Z direction in FIG. 5). The route keeping tape 17 is so formed that the route keeping tape 17 is more difficult to extend or buckle in the widthwise direction than the corrugated tube 16. Since the details of the above-described process is well known, the description is omitted herein.

A metal foil tape, a hard resin tape or the like can be used as the route keeping tape 17. For example, an aluminum foil tape, a stainless steel tape or the like is preferred to be used as the metal foil tape, but the material is not limited to these. Plating may be performed as needed. Adhesive is applied to one side surface of the metal foil tape. A polycarbonate sheet (of a tape shape), an acrylic sheet (of a tape shape) or the like can be used as the hard resin tape, but the material is not limited to these. Adhesive is applied to one side surface of the hard resin tape.

Before the corrugated tube 16 is bended (refer to FIG. 4A), an interval between a ridge (convex part) 33 and a ridge 33 adjacent to the ridge 33 at the upper side of the corrugated tube 16 (a pitch A1) is equal to an interval between a ridge (convex part) 31 and a ridge 31 adjacent to the ridge 31 at the lower side of the corrugated tube 16 (a pitch A1).

After the corrugated tube 16 is bended (refer to FIG. 4B), an interval between the ridge 33 and the adjacent ridge 33 at the outer side part 21 of the corrugated tube 16 (a pitch A2) becomes larger than the pitch A1. On the other hand, an interval between the ridge 31 and the adjacent ridge 31 at the inner side part 22 of the corrugated tube 16 (a pitch A3) becomes smaller than the pitch A1. That is, the corrugated tube 16 expands at the outer side part 21 in the longitudinal direction and contracts at the inner side part 22 in the longitudinal direction.

For example, if hands that make the corrugated tube 16 bended are released, a force which makes the corrugated tube 16 return to a state before the corrugated tube 16 is bended (a restoring force) is applied, and the corrugated tube 16 returns to the original state shown in FIG. 4A. That is, the wire harness 9 returns to a straight line shape, and is not maintained in the bended shape.

Thus, in this embodiment, the route keeping tape 17 is wound helically around the bent part 20 along the longitudinal direction of the corrugated tube 16 to fix the interval between the ridges 33, 33 arranged to be adjacent to each other (a width A2 in FIG. 4B) and the interval between the ridges 31, 31 arranged to be adjacent to each other (a width A3 in FIG. 4B). For the wire harness 9 according to the present embodiment, the route keeping tape 17 is so formed that the width of the route keeping tape 17 in the central axis direction of the corrugated tube 16 is longer than the width of the bottom surfaces which define the valleys (concave parts) in the central axis direction. The route keeping tape 17 is wound around the corrugated tube 16 in the longitudinal direction to cover the valleys 32, 32 arranged to be adjacent to each other and to cover the valleys 34, 34 arranged to be adjacent to each other (refer to FIG. 3).

As described above, since the route keeping tape 17 which is more difficult to extend or buckle in the widthwise direction than the corrugated tube 16 is wound around the corrugated tube 16 to fix the interval between the ridges 33, 33 arranged to be adjacent to each other and the interval between the ridges 31, 31 arranged to be adjacent to each other, the width A2 at the outer side part 21 is difficult to return to the width A1. Further, the width A3 at the inner side part 22 is difficult to return to the width A1. Therefore, the interval between the ridges 33, 33 arranged to be adjacent to each other at the outer side part 21 and the interval between the ridges 31, 31 arranged to be adjacent to each other at the inner side part 22 can be maintained constant, respectively. Therefore, the maintenance of the bended state of the bent part 20 of the corrugated tube 16 (route maintenance) can be performed surely.

The shapes of the ridges and valleys of the corrugated tube are preferable, for example, as those shown in FIGS.

6A and 6B. In FIGS. 6A to 6C, letters S show ridges (convex parts) and letters T show valleys (concave parts). The shape of a traditional corrugated tube 66 in which ridges 71 and valleys 72 alternate continuously is a shape which has curved top parts, as shown in FIG. 6C. Therefore, when the route keeping tape 17 is wound around the corrugated tube 66 by the above-described method, the areas where the route keeping tape 17 is attached to two ridges 71 adjacent to a valley 72 are limited to the areas close to the tops of the ridges 71.

In contrast, as shown in FIG. 6A, when ridges 51 of a corrugated tube 46 have rectangular shapes, since the width of the ridge 51 (the width in the central axis direction of the corrugated tube) is longer than the width of the ridge 71 shown in FIG. 6C, the areas where the route keeping tape 17 is attached to the ridges 51 become larger. Therefore, the route holding force of the wire harness 9 can be improved.

In a longitudinal section of a corrugated tube 56, when the distance from the rising edge of a ridge 61 to the rising edge of an adjacent valley 62 along the longitudinal direction is measured as a pitch a (refer to FIG. 6B), usually, this pitch a is the same over the full length of the wire harness.

As shown in FIG. 6B, for the corrugated tube 56, if the width of the ridge 61 is made to be longer than the width of the valley 62, the width of the ridge 61 can be increased. That is, the wire harness 9 according to the present embodiment is so formed that for the corrugated tube 56, the width of the top surface of the ridge (the convex part) 61 in the central axis direction is longer than the width of the bottom surface which defines the valley (the concave part) 62 in the central axis direction. Therefore, the areas where the route keeping tape 17 is attached to the ridges 61 become larger than before. Therefore, the route holding force of the wire harness 9 can be improved.

As described above, the route keeping tape 17 can maintain the bended shape of the bent part 20 by being wound around the bent part 20 along the longitudinal direction as described above. According to the wire harness 9 of the present embodiment, not only a flexible corrugated tube is simply provided as an exterior member of the conductive path, but the corrugated tube may be maintained in a desired shape. Further, a low cost, versatile wire harness for which a protector is not necessary can be provided. That is, for the wire harness 9 according to the present embodiment, since standard components (replaceable components) such as, the corrugated tube and the route keeping tape are used as substitutes for the resin molded protector, there is no need for vehicle exclusive components or metal molds. Therefore, the manufacturing cost of the wire harness can be reduced. Since the route keeping tape is used instead of a protector, the weight can be reduced and design modification can be easy to perform.

The features of the embodiment of the wire harness according to the present invention described above are briefly, collectively listed in the following (1) to (4), respectively.

(1) The wire harness 9 according to the present embodiment includes the flexible, tubular corrugated tube 16 which is an exterior member and covers two electric wires 18 of at least one conductive path, and the route keeping tape 17 which is more difficult to extend or buckle in the widthwise direction than the corrugated tube 16. The route keeping tape 17 is wound helically around the bent part 20 which is formed by bending the corrugated tube 16 in the longitudinal direction of the corrugated tube 16.

(2) For the wire harness 9 according to the present embodiment, the corrugated tube 16 is formed with the convex parts and the concave parts, which extend in the peripheral direction, alternately along the longitudinal direction, and the top surfaces of the convex parts are formed to a peripheral surface which extends in parallel to the central axis of the corrugated tube 16 in the cross section in parallel to the central axis. The width of the top surfaces of the convex parts in the central axis direction of the corrugated tube 16 is longer than the width of the bottom surfaces which define the concave parts of the corrugated tube 16 in the central axis direction.

(3) For the wire harness 9 according to the present embodiment, the width of the route keeping tape 17 in the central axis direction is longer than the width of the bottom surfaces which define the concave parts of the corrugated tube 16 in the central axis direction, so that the route keeping tape 17 is wound around the bent part 20 to cover the concave parts.

(4) For the wire harness 9 according to the present embodiment, the corrugated tube 16 is formed with the convex parts and the concave parts, which extend in the peripheral direction, alternately along the longitudinal direction, the top surfaces of the convex parts are formed into a plane shape, the rising angle of the convex parts becomes sharper, and the width of the top surfaces of the convex parts in the central axis direction of the corrugated tube 16 becomes longer.

It is apparent that various modifications can be made to the invention without changing the purpose of the invention. For example, the route keeping tape 17 in the embodiment described above is difficult to extend or buckle in the widthwise direction, but the route keeping tape 17 may slightly extend in the longitudinal direction.

Although the invention is described in detail with reference to specific embodiments, it is apparent that various modifications and amendments may be made by those skilled in the art without departing from the spirit and scope of the invention.

This application is based on the Japanese patent application (patent application No. 2011-160134) filed on Jul. 21, 2011, whose content is incorporated herein by reference.

INDUSTRIAL APPLICABILITY

The wire harness according to the present invention is useful in that a route keeping tape is used for an exterior member instead of a protector and a desired shape of the exterior member is maintained.

REFERENCE SIGNS LIST

1 . . . hybrid vehicle
2 . . . engine
3 . . . motor unit
4 . . . inverter unit
5 . . . battery
6 . . . engine room
7 . . . vehicle rear part
8 . . . high voltage wire harness
9 . . . wire harness
10 . . . middle part
11 . . . vehicle body floor
12 . . . junction block
13 . . . rear end
14 . . . front end
16 . . . corrugated tube (exterior member)
17 . . . route keeping tape
18 . . . electric wire (conductive path)

19 . . . electromagnetic shielding member
20 . . . bent part
21 . . . outer side part
22 . . . inner side part
23 . . . side part
46 . . . corrugated tube (exterior member)
56 . . . corrugated tube (exterior member)

The invention claimed is:

1. A wire harness comprising:
an exterior member, having flexibility and a corrugated tubular shape comprising ridges and valleys arranged in a longitudinal direction, and covering at least one conductive path; and
a route keeping tape having rigidity in a widthwise direction such that the route keeping tape is more difficult to extend and buckle in the widthwise direction than the exterior member,
wherein the route keeping tape is wound helically around a bent part, which is formed by bending the exterior member, along the longitudinal direction, and
wherein the widthwise direction of the route keeping tape is substantially parallel to the longitudinal direction such that an interval between adjacent ridges which sandwich the valleys is covered by the route keeping tape to maintain the bended shape of the bent part.

2. The wire harness according to claim 1, wherein
the exterior member is formed with the ridges and the valleys which extend in a peripheral direction, alternately along the longitudinal direction, and
top surfaces of the ridges are formed to a peripheral surface which extends in parallel to a central axis of the exterior member in a cross section in parallel to the central axis, and a width of the top surfaces of the ridges in the central axis direction is longer than a width of bottom surfaces which define the valleys in the central axis direction.

3. The wire harness according to claim 2, wherein
a width of the route keeping tape in the central axis direction is longer than the width of the bottom surfaces which define the valleys in the central axis direction, so that the route keeping tape is wound around the bent part to cover the valleys.

4. The wire harness according to claim 3, wherein
the width of the route keeping tape in the central axis direction is less than an interval distance including one ridge of the ridges and one valley of the valleys in the central axis direction; and
the route keeping tape is wound helically around the bent part such that the route keeping tape is not overlapped.

5. The wire harness according to claim 1, wherein
the exterior member is formed with the ridges and the valleys which extend in a peripheral direction, alternately along the longitudinal direction,
top surfaces of the ridges are formed into a plane shape, a rising angle of the ridges is sharp, and a width of the top surfaces of the ridges in a central axis direction of the exterior member is longer than a width of bottom surfaces of the valleys in the central axis direction.

* * * * *